United States Patent [19] [11] 4,282,472
Martin [45] Aug. 4, 1981

[54] DIGITAL GENERATION AND CONTROL OF VARIABLE PHASE-ON MOTOR ENERGIZATION

[75] Inventor: Donald P. Martin, Wheeling, Ill.

[73] Assignee: Qwint Systems, Inc., Northbrook, Ill.

[21] Appl. No.: 38,922

[22] Filed: May 14, 1979

[51] Int. Cl.³ .............................................. G05B 19/40
[52] U.S. Cl. ................................... 318/696; 318/138
[58] Field of Search ................ 318/685, 696, 254, 138

[56] References Cited

U.S. PATENT DOCUMENTS

| 4,093,905 | 6/1978 | Von Braun | 318/696 |
| 4,127,800 | 11/1978 | Long et al. | 318/685 |
| 4,192,131 | 3/1980 | Hosokawa et al. | 318/696 |

Primary Examiner—J. V. Truhe
Assistant Examiner—Eugene S. Indyk
Attorney, Agent, or Firm—Lockwood, Dewey, Alex & Cummings

[57] ABSTRACT

A control system for controlling a motor having a plurality of electromagnetic field windings adapted to be separately energized by switching circuitry to control rotation of a rotor in the motor. Digital circuitry generates a plurality of logic signals, one for each respective motor field winding to cause the switching circuitry to energize the field windings in a two phase on mode, a one phase on mode, or in one of a plurality of fractional phase on modes. A signal command source provides a plurality of digital signals to select or gate the desired phase on energization mode of the field windings in response to a feedback signal derived from detecting rotary movement of the rotor. Related methods of controlling a multi-phase motor with digitally generated variable phase modes are also disclosed.

9 Claims, 15 Drawing Figures

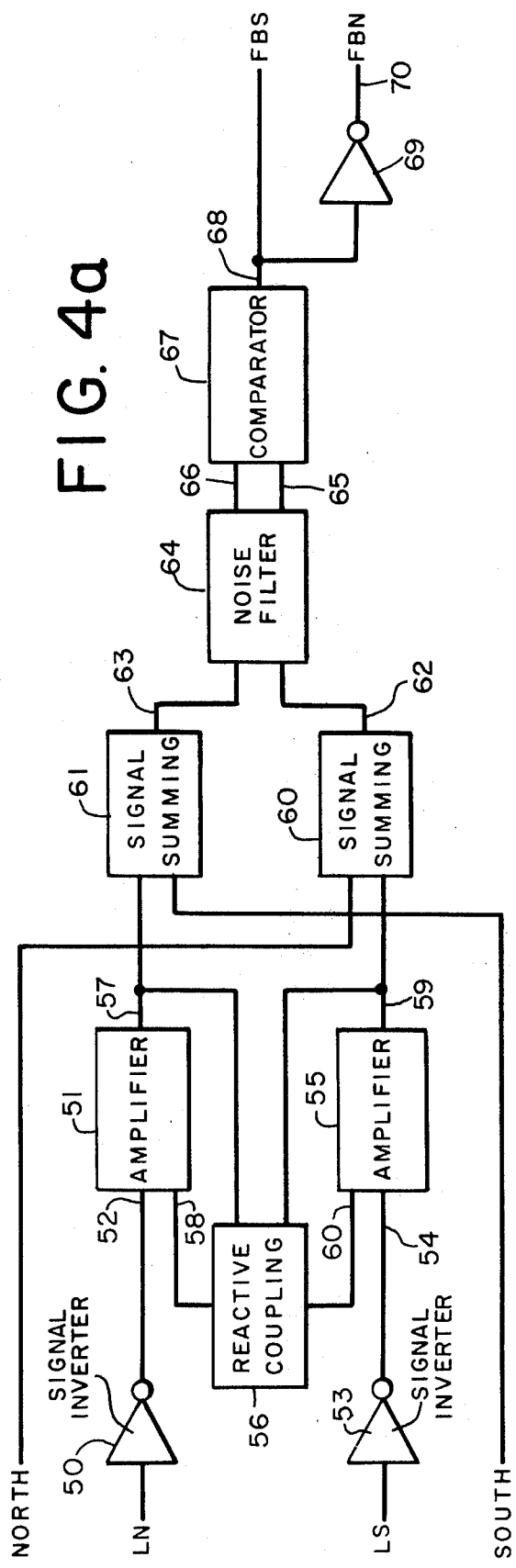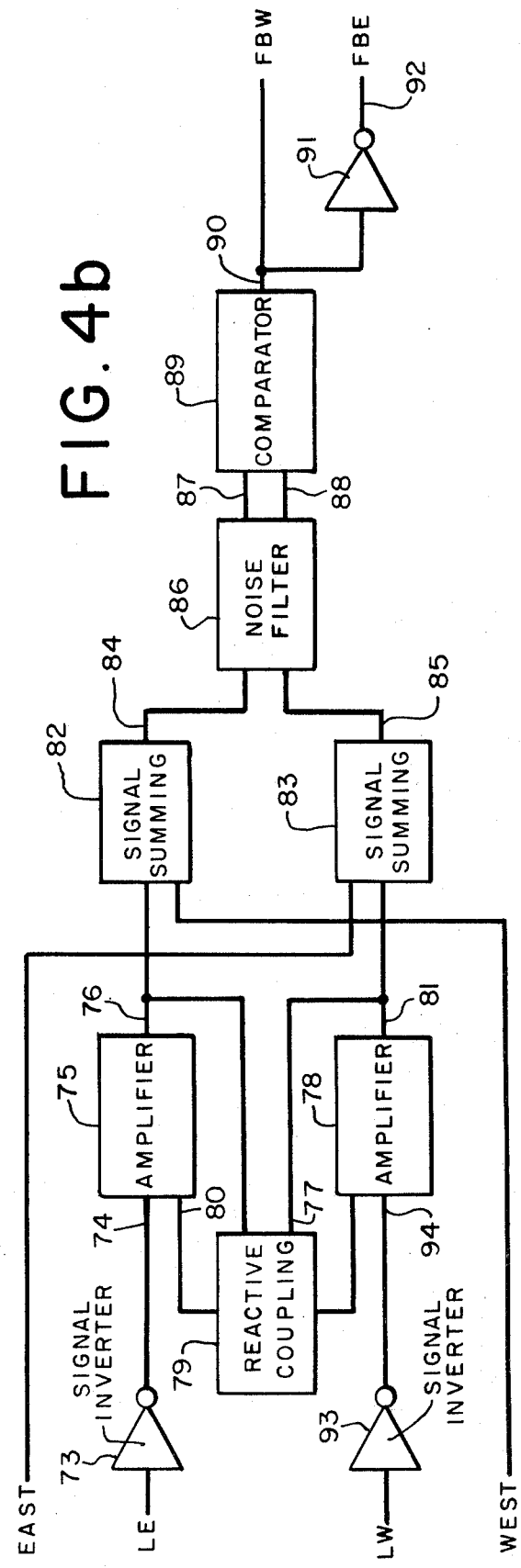

DIGITAL GENERATION AND CONTROL OF VARIABLE PHASE-ON MOTOR ENERGIZATION

BACKGROUND OF THE INVENTION

This invention relates in general to a control system for controlling a multi-phase motor with a plurality of electromagnetic field windings adapted to be separately energized in a variety of energization modes to control rotation of a rotor in the motor, and is more particularly concerned with such a control system including digital circuit means for generating a plurality of logic signals for controlling energization of respective motor field windings in either two-phase-on, one-phase-on, or one of a plurality of fractional phase-on modes with the desired energization phase mode selected by circuitry responsive to a feedback signal developed by detecting rotary movement of the rotor. The invention finds particular application in a high speed teleprinter of the type employing a multi-phase stepping motor for positioning a print head, wherein the stepping motor must be operated over a wide range of operating speeds with a high degree of precision and reliability.

In the operation and control of many motors, and particularly with stepping motors in which it is desired to control the rotational position of a rotor in the motor in a step-by-step manner, the motor windings are frequently energized in a sequential on/off manner from a D.C. voltage source. Such energization characteristics are particularly suited to and compatible with digital switching techniques. However, it is also common to develop an analog feedback or error signal by detecting the angular position and/or movement of the rotor in relation to energization of the field windings. Analog-to-digital conversion techniques to utilize the analog feedback signal to develop the digital winding energization signals are often impractical and uneconomical.

Furthermore, the duration of digital signals suitable for energizing the field windings must vary between wide limits to control the motor over a related range of operating conditions. For example, to obtain maximum motor torque during starting, acceleration or high load conditions, it may be desirable to simultaneously energize more than one field winding to develop greater rotor torque. During steady state operation of the motor at the desired speed and load conditions, suitable duration of field winding energization may be less than so-called "one-phase-on" wherein each field winding is sequentially energized and remains energized only until the next field winding is energized. During deceleration, reduced load or the like, the desired duration of field winding energization may be minimal or zero.

It is therefore a primary object of the present invention to provide digital circuitry for generating a plurality of logic signals adapted to control energization of respective field windings in a variety of energization modes such as two phase on, one phase on and in one of a plurality of fractional phase on modes.

A related object of the present invention is to provide phase on selection means responsive to a feedback or error signal to select the most suitable of the various phase on energization modes to obtain the desired motor performance.

Another object of the present invention is to provide gating means interposed between the two phase on, single phase on and various fractional phase on signal generating means and between the switching means, with the gating means having inputs responsive to signals from the signal selecting means to selectively gate the desired phase on mode logic signals from the signal generating means to the switching means for energization of the field windings in the desired phase on mode.

Yet another object of the present invention is to generate two phase on, single phase on and a plurality of fractional phase on modes with standard and inexpensive logic flip flops and NAND gates.

A further object of the present invention is to provide methods of controlling a multi-phase motor in a variety of winding energization modes by generating a plurality of logic signals representing the various energization modes and selecting the desired energization mode in response to a feedback signal derived from detection of rotor movement in response to energization of the windings.

SUMMARY OF THE INVENTION

These advantages of the invention, and others, including those inherent in the invention, are provided by a control system for separately controlling energization of a plurality of electromagnetic field windings of a motor to control rotation and/or angular position of a rotor by generating a plurality of sets of logic signals suitable for controlling energization of the motor field windings for discrete time durations representative of various motor energization phase on modes by selecting one of the sets of logic signals.

Logic signal generating means generates a plurality of logic signals, one for each respective motor winding, including logic signals respectively representative of two-phase-on, one-phase-on, and a plurality of fractional phase-on energization modes of the field windings. Signal selecting means is responsive to at least one error or feedback signal derived from detecting rotational movement of the rotor to select and gate logic signals from the signal generating means representative of the desired phase on mode energization of the field windings to the switching means to separately energize each field winding in response to a separate respective logic signal. Appropriate selection of the logic signals from the signal generating means may be accomplished by a gating circuit with the gating circuit having inputs responsive to a plurality of selection signals from the signal selecting means to route the desired logic signals to the switching means and cause the motor to be selectively energized in the desired motor winding phase on mode.

Two-phase-on mode logic signals are generated from a first flip flop having output terminals fed back into input terminals such that a pair of logic one signals is sequentially shifted between adjacent output terminals of the flip flop and the two phase on logic signals are obtained directly from the output terminals. One phase on mode logic signals are generated by a second flip flop similarly having four output terminals fed back into input terminals to cause successive shifting of a single logic one signal in relation to the output terminals. A third flip flop with associated logic circuitry for each output terminal of the third flip flop provides one-half phase on mode logic signals at respective output terminals of the logic circuitry. Successively smaller fractional phase on logic signals such as one-fourth, one-eighth, etc., may be generated by additional flip flops and logic circuitry similar to that for generating one-half phase on signals.

A method of controlling a multi-phase motor of the type having a plurality of electromagnetic field windings adapted to be separately energized to control rotational movement of the rotor includes the steps of detecting rotational movement of the rotor, developing a feedback or error signal related to rotational movement or angular position of the rotor, generating a plurality of logic signals suitable for energizing the field windings in a two phase on mode, generating another plurality of logic signals suitable for energizing the field windings in a one phase on mode, generating yet another plurality of logic signals suitable for energizing the field windings in a fractional phase on mode, generating a plurality of phase on selection signals in response to the feedback signal, selecting one of said plurality of logic signals for two phase on mode, single phase on mode or fractional phase on mode energization of the field windings with the plurality of phase on selection signals, and energizing the plurality of field windings in the selected phase-on mode in accordance with the selected plurality of logic signals.

BRIEF DESCRIPTION OF THE DRAWINGS

Features of the present invention which are believed to be novel and patentable, are set forth with particularity in the appended claims. The invention together with the further advantages thereof can best be understood by reference to the following description taken in conjunction with the accompanying drawings and the several figures in which like reference numerals identify like elements, and in which:

FIG. 4a is a block diagram of electronic circuitry for simulating a signal comparable to the signal induced into an unenergized field winding, but without any back EMF, and for comparing the simulated signal to the induced signal having the back EMF superimposed thereon to detect the back EMF and for providing a feedback signal upon detection of the back EMF.

FIG. 4b is a block diagram similar to FIG. 4a, but for detecting the back EMF from a different pair of motor windings having mutual inductance therebetween and for providing respective feedback signals.

DESCRIPTION OF THE PREFERRED EMBODIMENT

Figure 1:
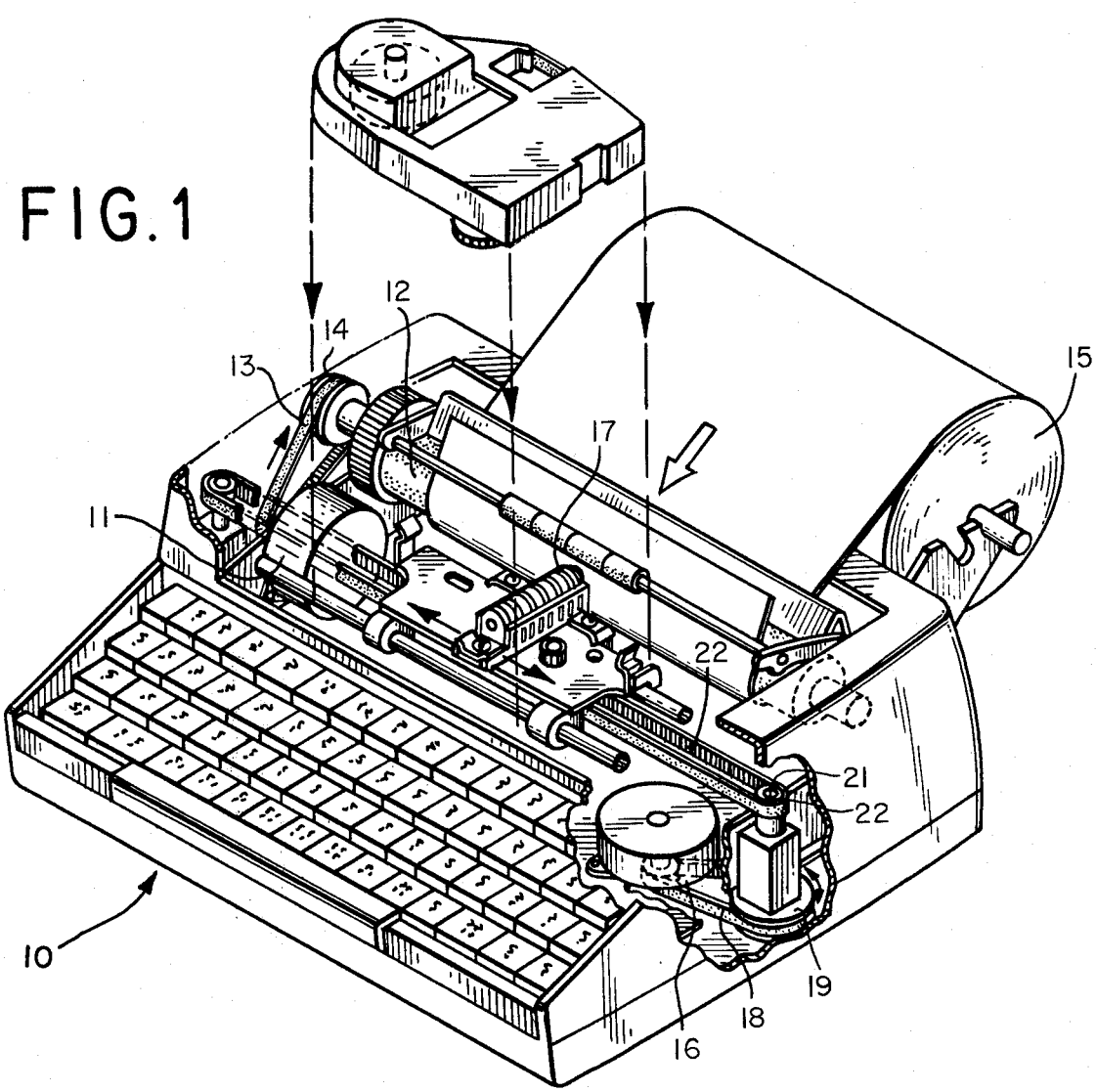
FIG. 1 is a perspective view, partially broken away, illustrating a teleprinter incorporating a motor control circuit constructed in accordance with the invention.
Figure 1A:
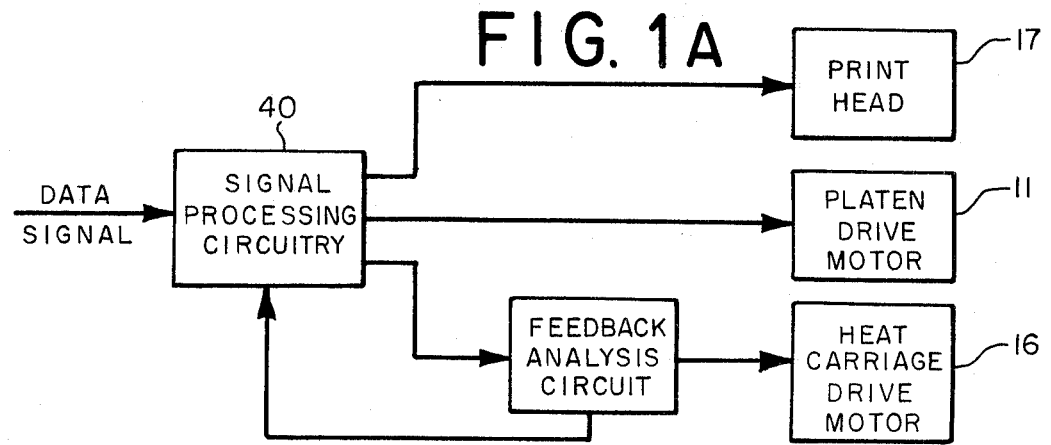
FIG. 1a is a simplified functional block diagram of the signal processing and control circuitry of the teleprinter.

Referring to FIG. 1, the motor control system of the invention is shown incorporated in a teleprinting unit, generally designated 10, having a first stepping motor 11 adapted to rotate a platen 12 by means of a cogged belt 13 and a cogged pulley 14 fixedly secured to one end of the platen. Stepping motor 11 precisely rotates platen 12 to feed paper about the platen in either roll form, such as from roll 15, or in sheet form.

A second stepping motor 16 is adapted to move a print head 17 transversely along and in proximity to platen 12 for printing alpha-numeric characters on the paper. To this end, stepping motor 16 drives a cogged belt 18 and a cogged pulley 19. Pulley 19 is coupled to a pulley 20 by a shaft 21. Pulley 21 drives a cogged belt 22 so as to position print head 17 in the desired position along the paper sheet.

In order for print head 17 to print the desired information on the paper sheet from roll 15 in an efficient manner, stepping motor 16 should be capable of operating at a wide range of speeds with consistently good acceleration and deceleration performance. That is, while stepping motor 11 may feed paper about platen 12 at a single or narrow range of speeds, it is desirable that stepping motor 16 cause print head 17 to sweep transversely either forwardly or rearwardly, across the paper sheet at a wide range of speeds, depending upon the amount and type of information to be printed, or on the occurrence of a carriage return. It is therefore desirable to monitor the present performance of the stepping motor 16 and to control subsequent energization of motor 16 to cause printing head 17 to sweep in the most effective and efficient manner.

Figure 2:
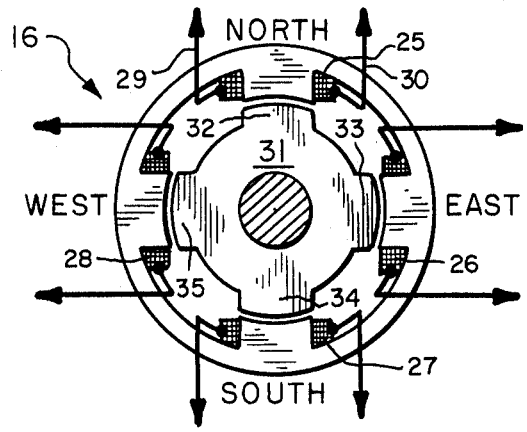
FIG. 2 is a simplified diagrammatic view of a four-phase stepping motor having four field poles designated North, East, South and West useful for explaining sequential energization of associated field windings and signal relationships between certain pairs of the field windings.

To better understand and appreciate the present invention, a four-pole, two-phase stepping motor is shown in simplified diagrammatic form in FIG. 2. For the purpose of convenience, the four field or stator pole positions are indicated by the primary compass points of North, East, South and West. It is understood in this context that North and South refer to angular positions and not to magnetic polarization. A separate field winding 25, 26, 27 or 28 is provided for electromagnetization of each respective North, East, South or West pole position. Each of windings 25, 26 27 and 28 have a pair of terminals 29 and 30 for appropriate wiring to a source of electrical energization as will be discussed in greater detail hereinafter. A rotor 31 of stepping motor 16 is mounted in the motor for rotation in the usual manner and has a plurality of permanently magnetized poles 32, 33, 34 and 35. Alternatively, the number of rotor poles may not necessarily equal the number of stator poles so as to obtain smaller incremental angular stepping action of the rotor, as in variable reluctance or hybrid motors. It is also known to those skilled in the art that field poles North, East, South and West may each occupy a plurality of angular positions within the motor such that stepping motor 16 may, for example, require two hundred steps for rotor 31 to complete one revolution. Furthermore, pairs of field windings, such as windings 25 and 27 and windings 26 and 28 may be magnetically separated by the use of the well known can-stacking arrangement such that only certain pairs of field windings have mutual inductance therebetween. Rotation of rotor 31 is effected by selective energization of field windings 25, 26, 27 and 28, usually sequentially and one at a time, to create magnetic attraction between one of the field poles North, East, South or West and one of the permanently magnetized rotor poles 32, 33, 34 or 35 to cause rotor 31 to rotate to a new angular position.

Figure 3:
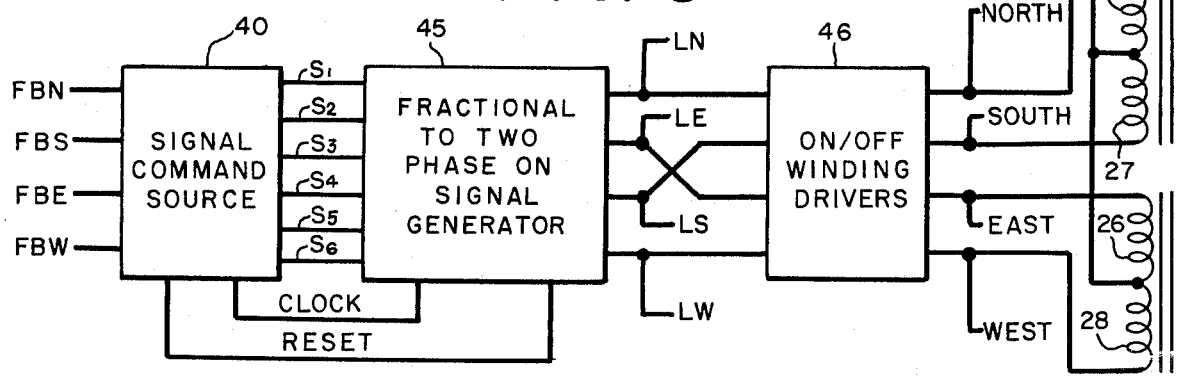
FIG. 3 is a block diagram illustrating a signal command source and a fractional to two-phase-on signal generator for generating a plurality of phase on energization mode logic signals and for selecting one of the modes in response to a feedback signal, on/off winding drivers being responsive to the selected logic signals to energize the windings in the selected energization mode.

With reference to FIG. 3, there is shown in block diagram form circuitry for selectively energizing field windings 25, 26, 27 or 28. A signal command source 40 provides a plurality of phase on mode selection signals on a plurality of output lines S1, S2, S3, S4, S5 and S6 to a fractional to two phase on logic signal generator 45, the operation of which is more fully presented hereinafter. Signal command source 40 also supplies a clock signal CK and a reset signal $\overline{RES}$ to signal generator 45 and may also supply actuation and/or control signals to print head 17. In response to selection signals S1 through S6, signal generator 45 supplies an output logic west signal LW, an output logic south signal LS, an output logic east signal LE, and an output logic north signal LN each having the selected phase on characteristics. Output logic signals LN, LE, LS and LW are utilized by a plurality of on/off winding drivers 46 to cause selective energization of respective field windings 25, 26, 27 or 28 from a voltage supply $V_B$ in accordance with the state of logic signals LN, LE, LS or LW. For example, if voltage supply $V_B$ is positive, output states of winding drivers 46 will normally be high. To energize one of field windings 25, 26, 27 or 28, the appropriate output line from winding driver 46 will assume a low state to apply the positive voltage from voltage supply $V_B$ across one of the field windings. If it is desired to selectively energize winding 25, NORTH line from winding driver 46 will assume the low state. Winding drivers 46 also isolate voltage supply $V_B$, which may be significantly greater in potential than typical logic levels, from the logic outputs of signal generator 45.

Figure 6:
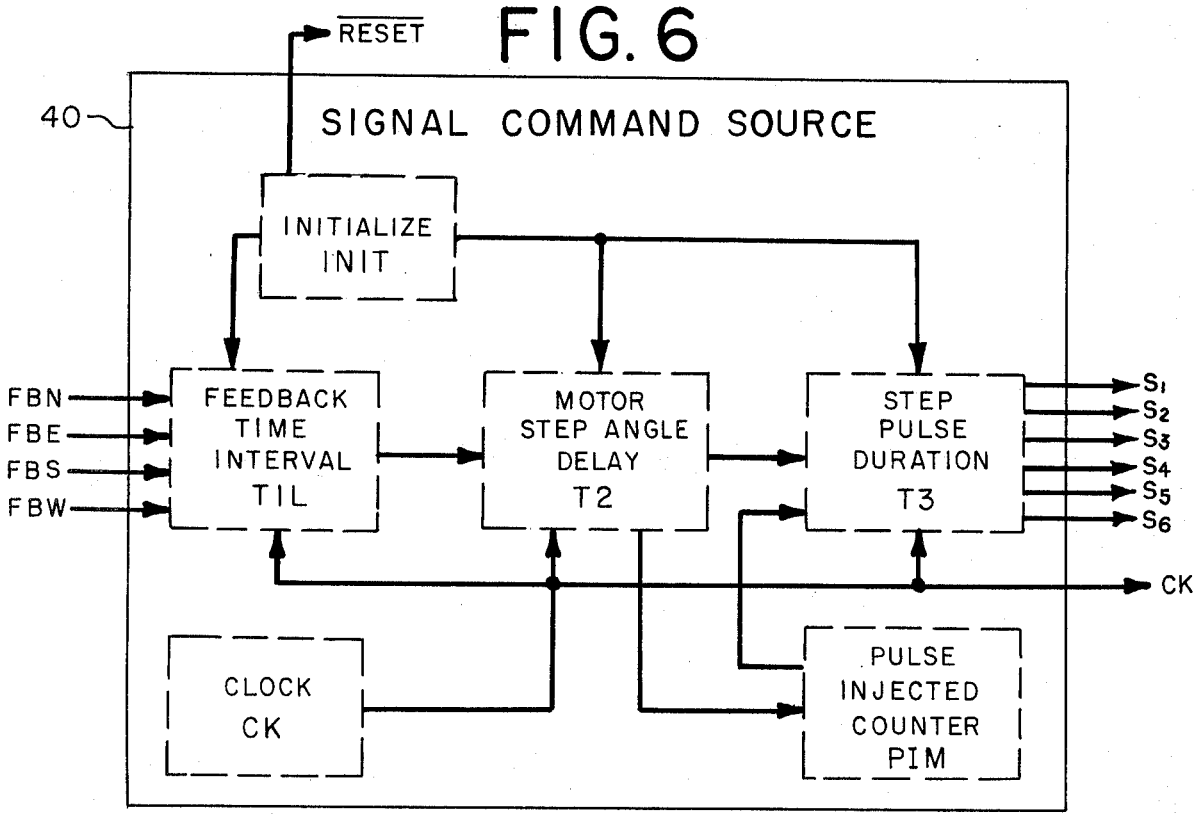
FIG. 6 is a block diagram of the signal command source in FIG. 3 illustrating the internal functions of the signal command source in greater detail.

Signal command source 40 in FIG. 3 is shown in greater detail in FIG. 6 and may encompass a wide variety of circuits suitable for providing selection signals S1 through S6 in response to at least one of feedback signals FBN, FBE, FBS and FBW, as will be more fully appreciated hereinafter. A preferred embodiment of signal command source 40 is a microprocessor integrated circuit, such as type 8080 commercially available from Datel Systems, Inc. of Canton, Massachusetts. Signal command source 40 includes a number of internal subcircuits or functions. A clock CK provides a time reference and synchronizing signals for other internal and external circuitry. A feedback time interval counter T1L measures the time between the last two feedback pulses, such as FBN, FBE, FBS or FBW, as by counting down from a present value such as 256 with each count representing a fixed increment of time such as 104.2 microseconds. If such a downcounter reaches zero, then this would mean that no feedback signal was received within a predetermined period such as 26.667 milliseconds. The lack of a feedback signal within the predetermined time interval indicates that rotor 31 of motor 16 has stalled or that a feedback pulse was not detected. A motor step angle delay T2 measures the delay from receiving a feedback pulse FBN, FBE, FBS or FBW to the beginning of the next step of the motor, also be means of a counter. A step pulse duration T3 stores the pulse duration currently being used. Step pulse duration T3 is responsive to feedback time interval T1L and to motor step angle delay T2 to provide a logic one level on one of selection signal lines S1 through S6 to select a phase on energization mode in signal generator 45 to increase energization of the field windings if more power is required by the motor to maintain desired operation, or to decrease energization if less power is required. Step pulse duration T3 thereby selects the time for which any field winding 25, 26, 27 or 28 of the motor is energized. When the motor first starts stepping, the duration T3 is initialized to select a maximum value, such as two phase on energization, so that maximum energization is applied to the motor for maximum starting torque. As the motor begins to approach steady state operating conditions, step pulse duration T3 may decrease energization by selecting a single or a fractional phase on mode so that the motor will receive just enough power to maintain the desired performance. A pulse injection counter PIM is responsive to a zero or negative count in motor step angle delay T2 to cause step pulse duration T3 to select a higher energization mode before the next feedback pulse occurs. Signal command source 40 also provides external clock CK and reset $\overline{RES}$ signals to signal generator 45.

Figure 7:
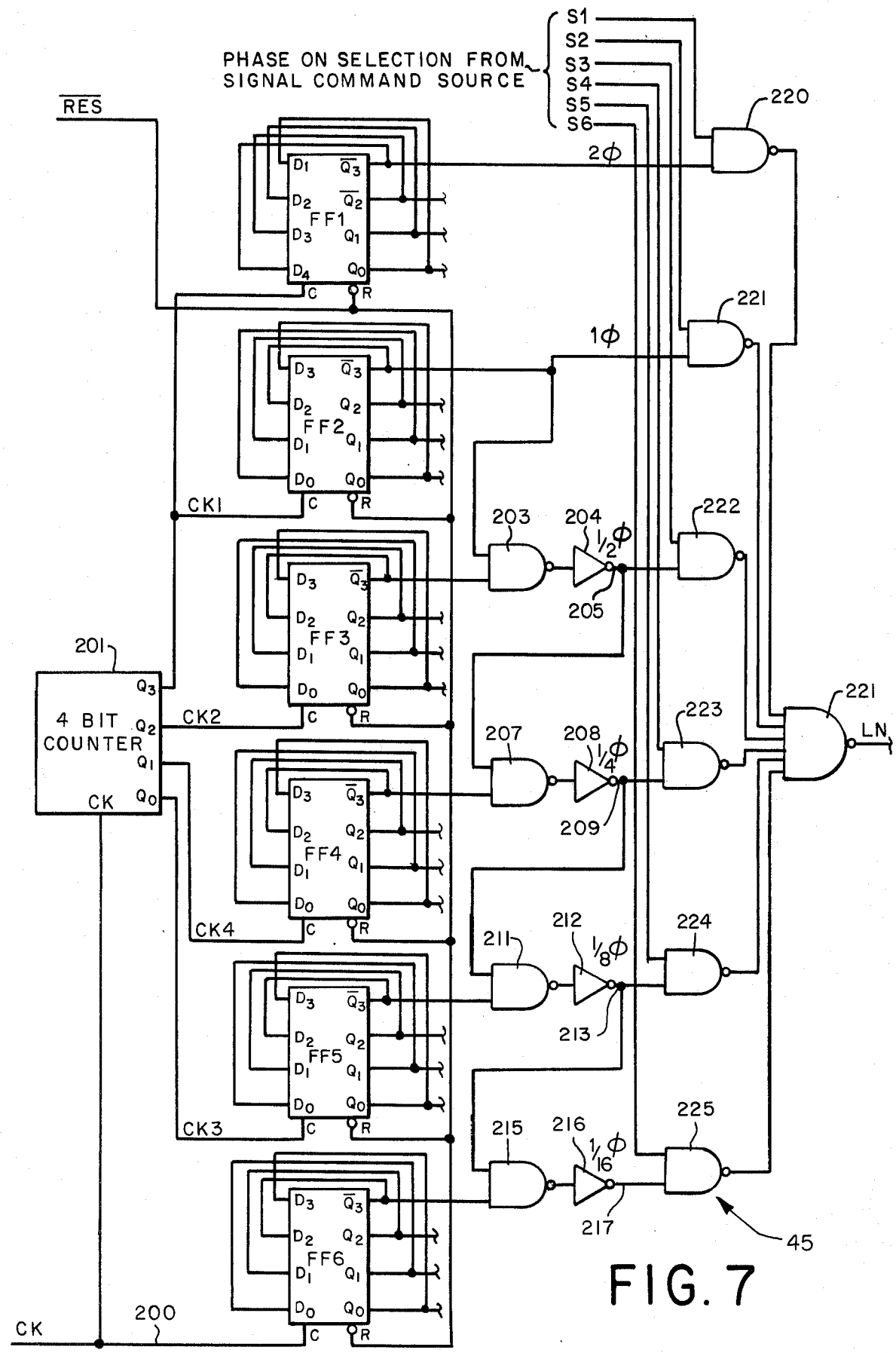
FIG. 7 is an electrical schematic diagram of the fractional to two phase on logic signal generator, including gating circuitry responsive to phase on selection signals from the signal command source in FIGS. 3 and 6 to gate one of the logic outputs from the various phase on mode generators to provide a logic output signal suitable for controlling one of the motor field windings in the desired phase on mode.
Figure 7A:
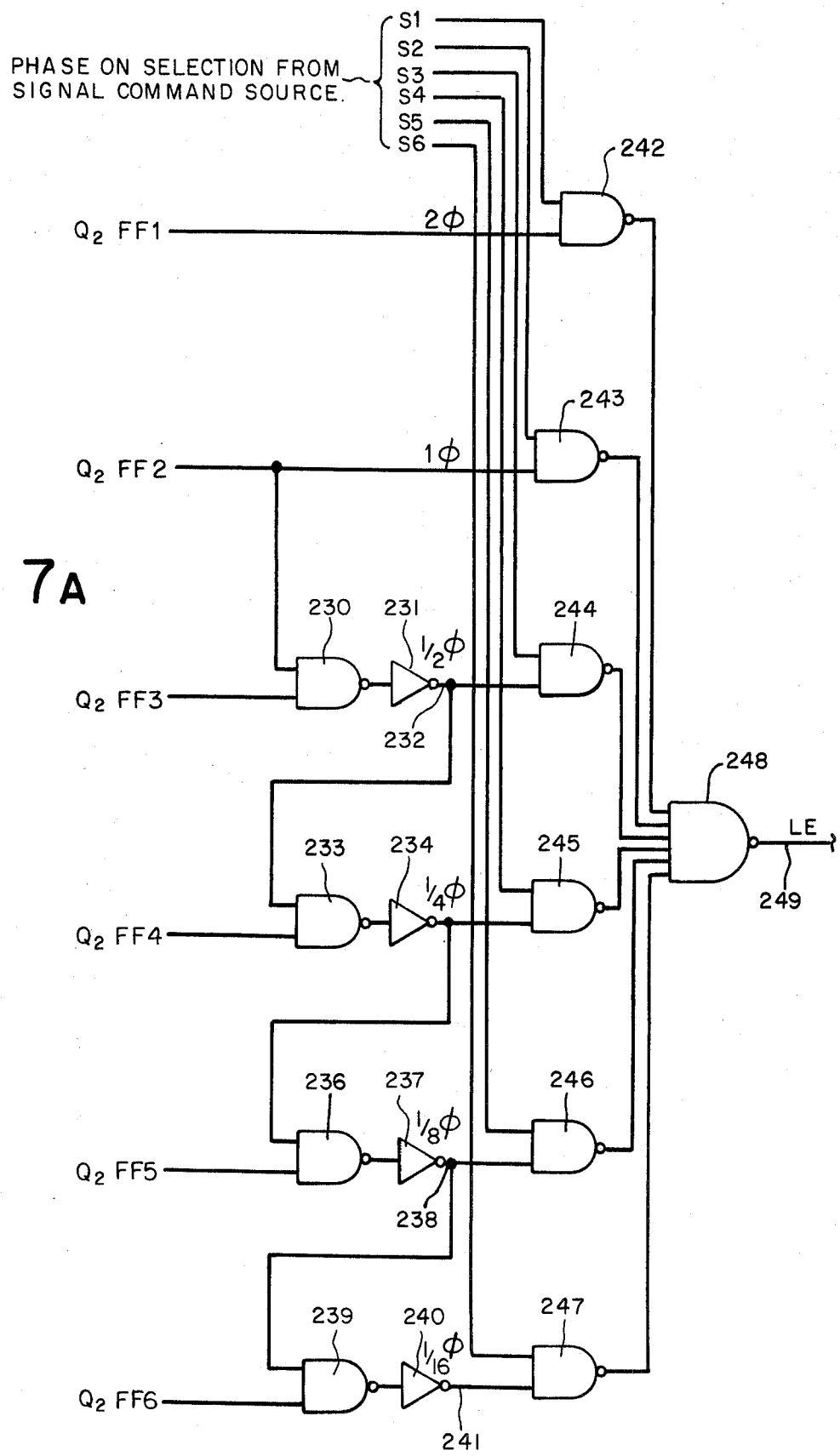
FIG. 7a is an electrical schematic diagram of another portion of the gating circuitry for combining a logic signal from each of the plurality of phase on generators in FIG. 7, also gated by phase on selection signals from the signal command source to provide a logic output signal suitable for controlling another of the motor field windings.
Figure 8:
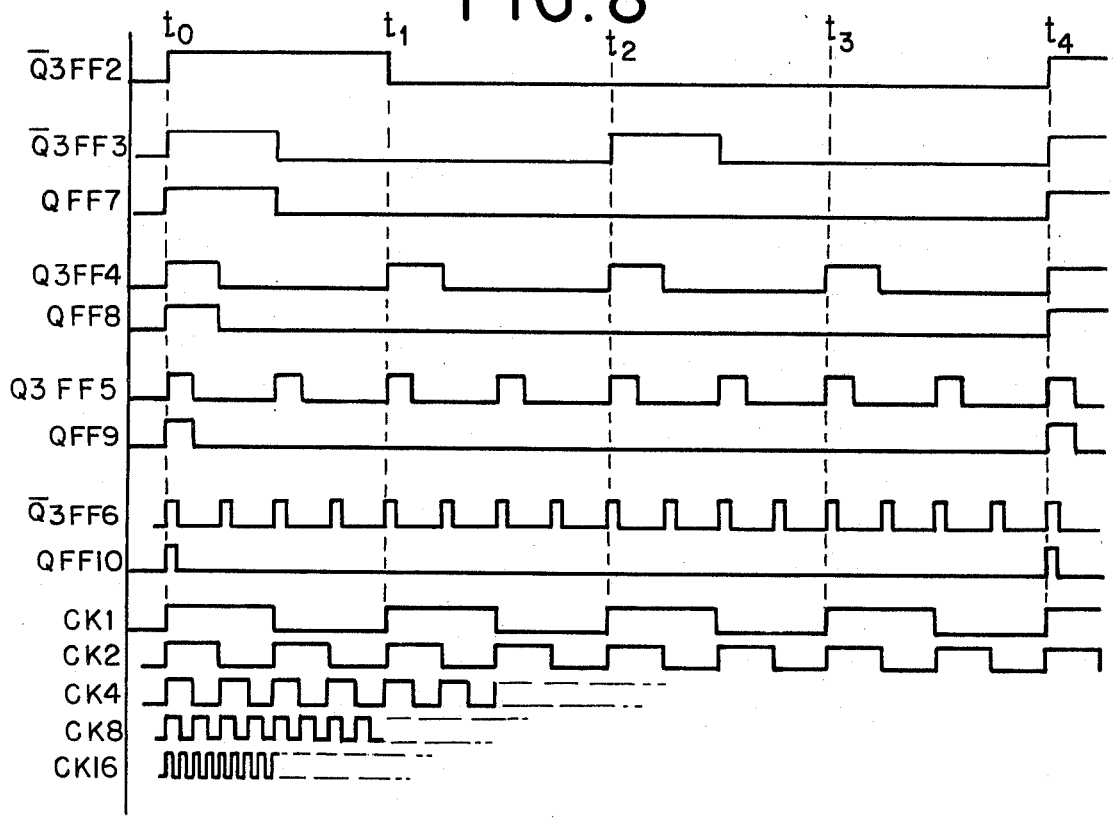
FIG. 8 is a graphic diagram of electrical signals in the signal generator of FIGS. 7 and 7a useful for explaining operation of the fractional to two phase on signal generator.

A preferred embodiment of fractional to two phase on logic signal generator 45 in FIG. 3 is shown in the electrical schematics of FIGS. 7 and 7a. Clock signal CK from signal command source 40 is input to logic signal generator 45 on an input line 200. Clock signal CK is also input to a four bit counter 201 which divides the clock frequency by successive factors of two. A clock signal CK8 on an output Q0 of counter 201 is one-half the frequency of clock signal CK. Similarly, a clock signal CK4 on an output Q1 of counter 201 is one-fourth that of clock signal CK, a clock signal CK2 on an output Q2 of counter 201 is one-eighth that of clock signal CK and a clock signal CK1 on an output Q3 of counter 201 is one-sixteenth that of clock signal CK. The timing of clock signals CK, CK1, CK2, CK4 and CK8 are shown in FIG. 8. It will be readily apparent to those skilled in the art that other means of providing the clock signals, including other types of frequency dividing means may be employed.

Figure 9:
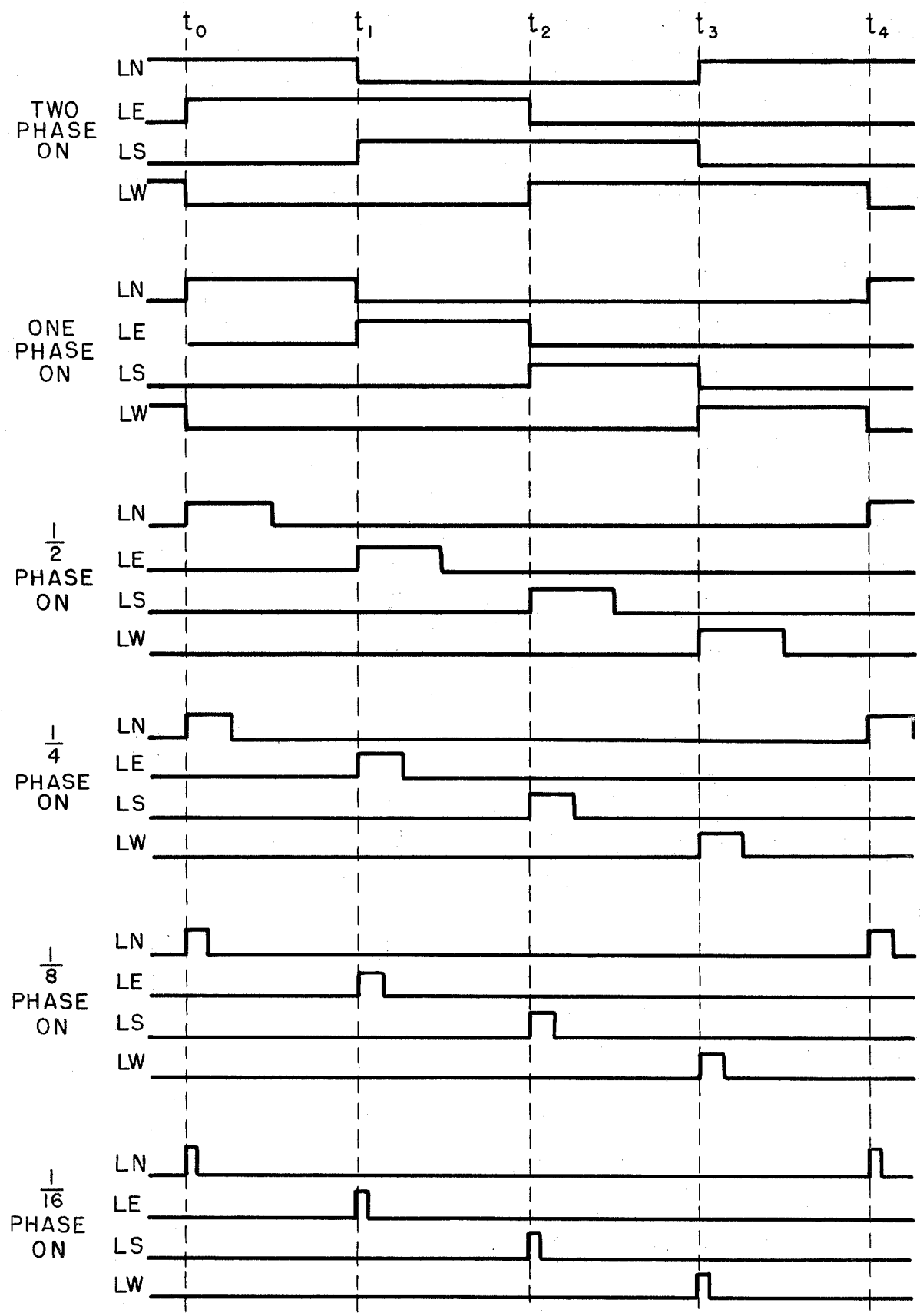
FIG. 9 is a graphic diagram of logic output signals of the fractional to two phase on signal generator suitable for controlling energization of the field windings of a four-phase motor.

In accordance with one aspect of the invention, fractional to two phase on signal generator 45 utilizes a plurality of flip flops, such as flip flops FF1, FF2, FF3, FF4, FF5 and FF6, to initiate generation of the various phase on mode logic signals in response to the respective clock signals. Each of flip flops FF1 through FF6 is wired so that the state at any output terminal is shifted to an adjacent output terminal upon the next clock signal in the manner of a ring counter. For example, an output $\overline{Q3}$ of flip flop FF1 is fed to an input D2 such that on the next clock signal CK1, the logic state formerly present at output $\overline{Q3}$ will appear at an output $\overline{Q2}$. In a like manner, output Q2 is fed to an input D1 such that on the next clock signal, an output Q1 will reflect to the logic state previously present at output $\overline{Q2}$. The state at output Q1 is similarly fed to an input D0 such that the logic state present at Q1 will appear at an output Q0 on the next clock cycle, and lastly, output Q0 is fed into an input D3 such that the logic state present at output Q0 will be shifted to output $\overline{Q3}$ on the next clock signal. Each of flip flops FF1 through FF6 are reset by common reset signal RES from signal command source 40. Reset signal $\overline{RES}$ causes flip flop FF1 outputs $\overline{Q3}$ and $\overline{Q2}$ to assume a logic one state and outputs Q1 and Q0 to assume a logic zero state. The logic ones at outputs $\overline{Q3}$ and $\overline{Q2}$ are then sequentially shifted by clock signal CK1 to outputs $\overline{Q2}$ and Q1, to outputs Q1 and Q0, and to outputs Q0 and $\overline{Q3}$, and then back to outputs $\overline{Q3}$ and $\overline{Q2}$. As will be more fully appreciated hereinafter, flip flop FF1 thereby generates two phase on energization signals LN, LE, LS and LW to control energization of respective field windings 25, 26, 27 and 28. The two phase on logic signals LN, LE, LS and LW are shown in FIG. 9. For the time interval $t_0$ to $t_1$, signals LN and LE are both at logic one states, as from flip flop FF1 outputs $\overline{Q3}$ and $\overline{Q2}$ for two phase on energization of respective motor field windings 25 and 26. For the time interval $t_1$ to $t_2$, signals LE and LS are both at a logic one level, as from flip flop FF1 outputs $\overline{Q2}$ and Q1 for energization of respective motor field windings 26 and 27. For the time interval $t_2$ to $t_3$, signals LS and LW are both at a logic one level, as from flip flop FF1 outputs Q1 and Q0 for two phase on energization of respective motor field windings 27 and 28. To complete one energization cycle, for the time $t_3$ to $t_4$, logic signals LW and LN are both at a logic one level, as from flip flop FF1 outputs Q0 and $\overline{Q3}$ to apply two phase on energization to respective motor field windings 28 and 25.

Each of flip flops FF2 through FF6 have similar input to output wiring to that of flip flop FF1, but output terminals Q2 of flip flops FF2 through FF6 are used instead of output terminal $\overline{Q2}$ as in flip flop FF1. Upon the occurrence of reset signal $\overline{RES}$, flip flops FF2 through FF6 have a single logic one state at output terminal $\overline{Q3}$ and logic zero states at other output terminals Q2, Q1 and Q0. A single logic one state is therefore sequentially shifted by respective clock signals from output $\overline{Q3}$ to output Q2 to output Q1 to output Q0 and then back to output $\overline{Q3}$. However, since flip flops FF2, FF3, FF4, FF5 and FF6 are respectively controlled by different frequency clock signals CK1, CK2, CK4, CK8 and CK, the single logic one state in these flip flops will be sequentially shifted through output terminals $\overline{Q3}$, Q2, Q1 and Q0 at different frequencies to produce different frequency pulses. For example, signals from output $\overline{Q3}$ for flip flops FF2 through FF6 are shown in FIG. 8. Due to the different applied clock frequencies, pulses 214 at output $\overline{Q3}$ of flip flop FF6 are one-half the time duration of pulses 210 at output $\overline{Q3}$ of flip flop FF5, which in turn are one-half the time duration of pulses 206 at output $\overline{Q3}$ of flip flop FF4, which in turn are one-half the time duration of pulses 202 at output $\overline{Q3}$ of flip flop FF3, which in turn are one-half the time duration of pulses at output $\overline{Q3}$ of flip flop FF2.

Output terminals $\overline{Q3}$, Q2, Q1 and Q0 of flip flop FF2 may be utilized to generate respective logic signals LN, LE, LS and LW for control of respective motor field windings 25, 26, 27 and 28 in the one phase on mode illustrated in FIG. 9. Since flip flop FF3 operates at twice the clock frequency of flip flop FF2, output terminals of flip flop FF3, as for example $\overline{Q3}$ shown in FIG. 8, will generate an extra pulse 202 at time $t_2$. This extra pulse 202 may be eliminated by suitable signal combining means, such as NAND gate 203 for combining output $\overline{Q3}$ of flip flop FF2 with output $\overline{Q3}$ of flip flop FF3, with an inverter 204 inverting the output of NAND gate 203, to provide the desired one-half phase on signal at an output terminal 205 of inverter 204. By similar means, extra pulses 206 generated at output $\overline{Q3}$ of flip flop FF4 during each complete energization cycle $t_0$ to $t_4$ may be eliminated by combining the one-half phase on signal at output terminal 205 of inverter 204 with the signal at output $\overline{Q3}$ of flip flop FF4 by means of a NAND gate 207, the output of which is inverted by an inverter 208 to provide a logic signal at an output terminal 209 representative of one-fourth phase on energization of motor field winding 25. Additional unwanted pulses 210 in output $\overline{Q3}$ of flip flop FF5 may likewise be eliminated by means of a NAND gate 211 to combine the one-fourth phase on mode signal at terminal 209 of inverter 208 with output $\overline{Q3}$ of flip flop FF5 by means of a NAND gate 211, the output of which is inverted by an inverter 212 to provide a logic signal at an output terminal 213 representative of one-eighth phase on mode energization of winding 25. Lastly, unwanted pulses 214 in output $\overline{Q3}$ of flip flop FF6 are eliminated by gating said output with the logic signal at terminal 213 of inverter 212 by means of a NAND gate 215, the output of which is inverted by an inverter 216 to provide a logic signal at an output terminal 217 representative of one-sixteenth phase on mode energization of winding 25.

In accordance with another aspect of the present invention, the type of phase on energization of the motor field windings may be selectively controlled by signal command source 40 in response to at least one of the feedback signals FBN, FBE, FBS or FBW. To this end, signal command source 40, as previously discussed, generates a plurality of phase on selection signals S1, S2, S3, S4, S5 and S6 to respectively select two phase on energization from flip flop FF1, single phase on energization from flip flop FF2, one-half phase on energization from terminal 205, one-fourth phase on energization from terminal 208, one-eighth phase on energization from terminal 213, or one-sixteenth phase on energization from terminal 217 to provide the logic north signal LN representative of the selected phase on energization mode for respective motor field winding 25. A NAND gate 220 combines selection signal S1 with output Q3 of flip flop FF1, another NAND gate 221 combines selection signal S2 with output Q3 of flip flop FF2, another NAND gate 222 combines selection signal S3 with the signal from output terminal 205 of inverter 204, another NAND gate 223 combines selection signal S4 with the signal from output terminal 209 of inverter 208, another NAND gate 224 combines selection signal S5 with the signal from output terminal 213 of inverter 212, and another NAND gate 225 combines selection signal S6 with the signal from output terminal 217 of inverter 216. Outputs of each of NAND gates 220 through 225 are combined by a NAND gate 226 to provide the logic north signal LN at an output thereof.

The gating circuitry in FIG. 7a combines outputs $\overline{Q2}$ of flip flop FF1 and outputs Q2 of flip flops FF2 through FF6 and, under the influence of phase on selection signals S1 through S6, provides a logic east signal LE for controlling energization of respective motor field winding 26 from two to one-sixteenth phase on energization mode in a manner similar to the gating and selecting portion of the circuitry in FIG. 7. The series combination of a NAND gate 230 and an inverter 231 eliminate an extra pulse in an output Q2 of flip flop FF3 by combining output Q2 of flip flop FF2 to provide a single phase on logic signal at an output terminal 232 of inverter 231. A series combination of a NAND gate 233 and an inverter 234 combine the signal at terminal 232 with output Q2 of flip flop FF4 to provide a one-fourth phase on logic signal at an output terminal 235 of inverter 234. Another series combination of a NAND gate 236 and an inverter 237 combine the one-fourth phase on signal at terminal 235 with output Q2 of flip flop FF5 to produce a one-eighth phase on logic signal at an output terminal 238 of inverter 237. Yet another series combination of a NAND gate 239 and an inverter 240 combine the one-eighth phase on signal at terminal 238 with output Q2 of flip flop FF6 to produce a one-sixteenth phase on logic signal at an output terminal 241 of inverter 240. Phase on selection signal S1 selects output $\overline{Q2}$ of flip flop FF1 by means of a NAND gate 242 for a logic east signal LE representative of two phase on, selection signal S2 selects output Q2 of flip flop FF2 by means of a NAND gate 243 for single phase on, selection signal S3 selects the signal at terminal 232 by means of a NAND gate 244 for one-half phase on, selection signal S4 selects the signal at terminal 235 by means of a NAND gate 245 for one-fourth phase on, selection signal S5 selects the signal at terminal 238 by means of a NAND gate 246 for one-eighth phase on, and selection signal S6 selects the signal at terminal 241 by means of a NAND gate 247 for one-sixteenth phase on. An output terminal of each of NAND gates 242 through 247 are combined by a NAND gate 248 to provide the logic east signal LE at an output terminal 249 thereof.

It will now be readily apparent to those skilled in the art that logic south signal LS may be generated by circuitry similar to that in FIG. 7a, but by utilizing outputs Q1 of flip flops FF1 through FF6 and logic west signal LW may similarly be generated by utilizing outputs Q0 of flip flops FF1 through FF6.

For selection of any one of the phase on modes, only one of the phase on selection signals S1 through S6 is at a logic one level with the remaining signals being at logic zero levels. Of course, no energization may be applied to the motor, if so desired, by simply having all of the selection signals S1 through S6 at logic zero levels. Further, if energization of the motor required to maintain steady state operation lies, for example, somewhere between one phase on and one-half phase on, signal command source 40 may at various times select either one phase on or one-half phase on operation to maintain the desired steady state operation.

Figure 10:
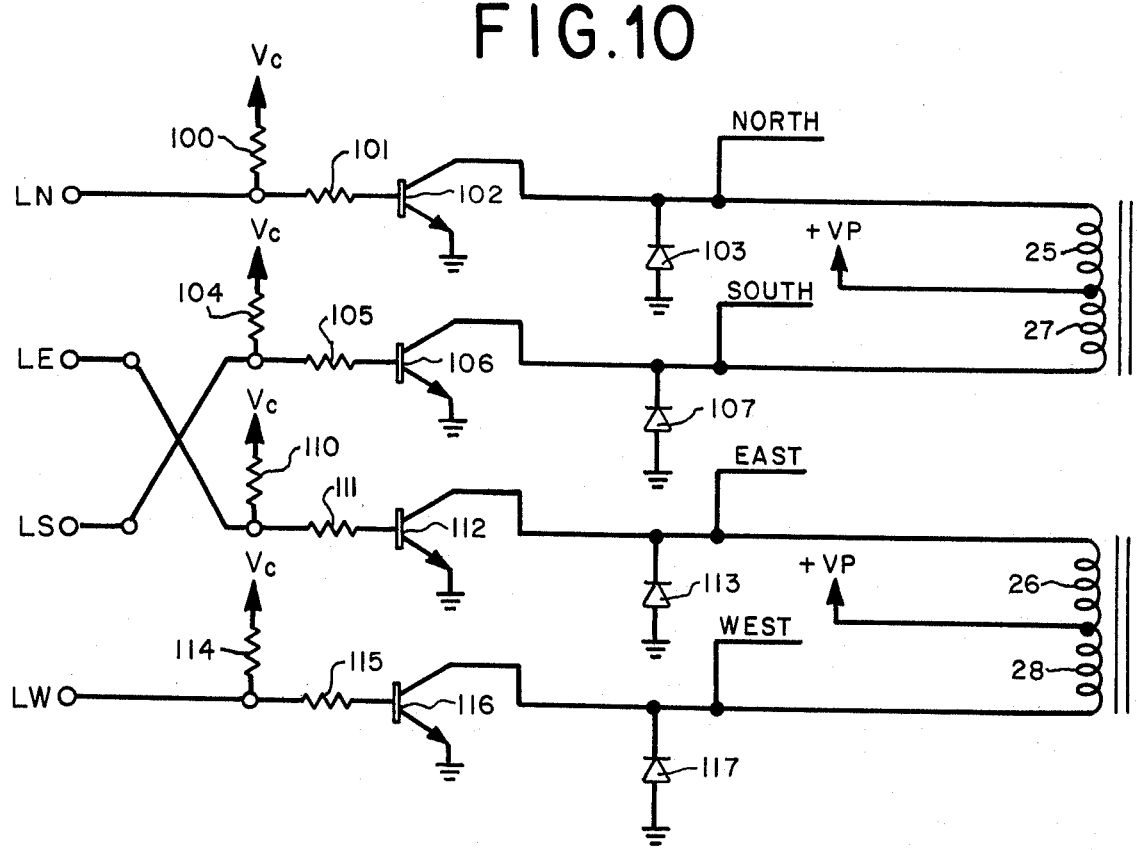
FIG. 10 is an electrical schematic diagram of the on/off winding drivers of FIG. 3 for energizing the field windings in response to the logic output signals of the fractional to two phase on signal generator.

The remaining circuitry in FIG. 3 is shown in schematic form in FIG. 10. As is best seen in FIG. 9, logic signals LN, LE, LS and LW are in progressive 90° phase relationship for the duration of a single winding energization cycle $t_0$ to $t_4$. Logic signal LN is connected to a pair of resistors 100 and 101 with resistor 100 connected at an opposite terminal to a source of voltage $V_C$ compatible with logic levels. An opposite terminal of resistor 101 is connected to the base of a transistor 102. The emitter of transistor 102 is grounded. The collector of transistor 102 is connected to the cathode of a diode 103 and to one terminal of North field winding 25. NAND gate 226 in FIG. 7 sinks current from voltage supply $V_C$ through resistor 100 during a zero state of logic north signal LN to to keep transistor 102 in a nonconductive state and field winding 25 is then unenergized. When logic north signal LN assumes a logic one state, transistor 102 is rendered conductive by the biasing of resistors 100 and 101 to begin sinking current from voltage supply $V_B$ through winding 25 to ground to thereby energize winding 25. As previously noted, a logic south signal LS is generated by circuitry similar to FIG. 7a and logic south signal LS is generally in 180° phase relationship to logic north signal LN. A NAND gate similar to gate 248 is connected to a pair of biasing resistors 104 and 105 with an opposite terminal of resistor 104 connected to voltage supply $V_C$. An opposite terminal of resistor 105 is connected to the base of a transistor 106. The emitter of transistor 106 is referenced to ground and the collector thereof is connected to the cathode of a diode 107 and to one terminal of South field winding 27. An opposite terminal of winding 27 is connected to voltage supply $V_B$ in a manner similar to winding 25, or windings 25 and 27 may be a single winding which is center-tapped to voltage supply $V_B$. The anode of diode 107 is referenced to ground. Diode 107 provides an inductive current path for winding 27 when transistor 102 initially becomes nonconductive. Diode 103 similarly provides an inductive current path for winding 25 when transistor 106 initially becomes nonconductive.

The energization condition or state of North field winding 25 is provided by a NORTH signal obtained from the terminal of winding 25 which is connected to the collector of transistor 102. NORTH signal provides information concerning energization of winding 25 due to signal LN, as well as any signal induced into winding 25 by energization of winding 27 because of mutual inductance therebetween, and any back EMF pulse 48 induced into winding 25 by rotor movement. In a related manner, a SOUTH signal at the terminal of winding 27 which is connected to the collector of transistor 106 will provide information on energization of South field winding 27, including energization caused by conduction of transistor 106, any signal induced into winding 27 by energization of North field winding 25 because of mutual inductance therebetween, and any back EMF pulse 48 induced into winding 27 by rotor movement. Since, as previously noted, energization of windings 25 and 27 will normally be about 180° out of phase and since signal generator 45 can at most simultaneously energize no more than two of the windings having 90° phase relationship, energization of winding 25 or 27 will not interfere with back EMF pulse 48 being induced into unenergized winding 27 or 25 by rotor movement.

On/off drivers 46 for controlling energization of windings 26 and 28 in response to respective signals LE and LW are similar to those for windings 25 and 27. Logic east signal LE at the output of NAND gate 248 in FIG. 7a normally sinks current from voltage supply $V_C$ through a resistor 110. Upon a logic one state of signal LE, current through resistor 110 and another resistor 111 to the base of a transistor 112 renders transistor 112 conductive to sink current from voltage supply $V_B$ through East field winding 26 to ground. The cathode terminal of a diode 113 is connected to the collector of transistor 112 and the anode terminal of diode 113 is referenced to ground. Logic west signal LW, derived from a NAND gate similar to gate 248 in FIG. 7a, normally sinks current from voltage supply $V_C$ through a resistor 114. Upon signal LW changing to a logic one state, current through resistor 114 is no longer diverted but provides base drive through a resistor 115 to a transistor 116. Transistor 116 is then rendered conductive and energizes West field winding 28 by conducting current from voltage supply $V_B$ through winding 28 and through transistor 116 to ground. A diode 117 has its cathode terminal connected to the collector of transistor 116 and the anode terminal thereof is referenced to ground. Diode 117 provides an inductive current path for current winding 28 upon transistor 112 becoming nonconductive. In a similar manner, diode 113 provides an inductive current path for winding 26 upon transistor 116 becoming nonconductive. Field windings 26 and 28 may be separate windings with one terminal of each winding connected to voltage source $V_B$ or windings 26 and 28 may be a single winding having a center tap to voltage supply $V_B$.

An EAST signal from the collector of transistor 112 provides information on the energization state of EAST field winding 26 resulting from conduction in transistor 112, and signals induced into winding 26 because of mutual inductance or rotor movement. A WEST signal at the collector of transistor 116 similarly provides information on the energization states or signals induced into winding 28 because of mutual inductance or rotor movement.

In energizing field windings 25, 26, 27 and 28 by means of respective logic signals LN, LE, LS and LW, it will be appreciated by those skilled in the art that the logic signals must lead the desired rotor position by more than 180°. This is due to the fact that the drive angle must lead the rotor position by about 90° to maintain maximum torque and a further lead must be maintained to account for the phase lag caused by inductance in the respective field windings. Further, due to the phase difference between the peak and average values of energization of the field windings, logic signals LN, LE, LS and LW may have to lead the rotor position by as much as about 315° under some operating conditions.

Figure 5:
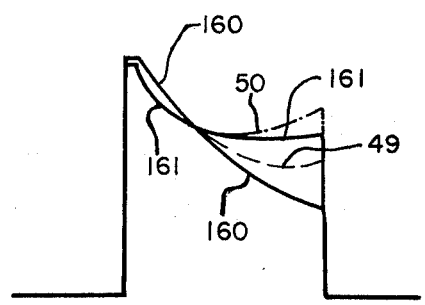
FIG. 5 is a graphic diagram of the simulated signal without any back EMF and the induced signal with back EMF, the simulated and induced signals superimposed for magnitude comparison by the comparator of FIG. 4a or 4b.

Rather than using means of physically detecting rotor rotation, as by a tachometer, photoelectric sensor or the like, to develop an error or feedback signal, the present invention uses electronic circuitry to detect back EMF wave 48 in FIG. 5 which is superimposed on signal 161 induced into an unenergized field winding of a pair of field windings having mutual inductance therebetween. Such circuitry is illustrated in block diagram form in FIG. 4a and develops a pair of output feedback signals FBN and FBS from the respective North and South field windings 25 and 27 and respective logic signals LN and LS. Logic north signal LN from FIG. 3 is inverted by a signal inverter 50 and the inverted signal is presented to one of a pair of input terminals 52 of a first operation amplifier 51. Logic south signal LS is similarly inverted by a signal inverter 53 and presented to an input terminal 54 of a second operational amplifier 55. A reactive coupling network 56 connected between an output terminal 57 and a second input terminal 58 of amplifier 51 and to an output terminal 59 and a second input terminal 60 of amplifier 55 causes amplifiers 51 and 55 to coact with each amplifier simulating a complementary portion of the L/R exponential decay of exponentially decaying signal 161 in response to a logic one state in one of respective logic signals LS or LN. For example, the presence of logic north signal LN will cause amplifiers 51 and 55 by way of change in output of amplifier 51 at output terminal 57, which is transmitted by reactive coupling network 56 to input terminal 60 of amplifier 55, to generate complementary portions of simulated signal 160. Since signals LN and LS are generally 180° out of phase, amplifiers 55 and 51 will again simulate complementary portions of simulated signal 160, which is comparable to induced signal 161 in FIG. 5 but without any superimposed back EMF wave 48. The output of amplifier 55 at terminal 59 and NORTH signal from field winding 25 in FIG. 3 are summed by a signal summing network 60. The output of amplifier 51 at terminal 57 is similarly summed with SOUTH signal from field winding 27 in FIG. 3 by a signal summing network 61. Separate outputs of signal summing networks 60 and 61 on a pair of respective output lines 62 and 63 are filtered by a noise filter 64 and then presented to a respective pair of input terminals 65 and 66 of a voltage comparator 67. Comparator 67 oppositely sums the complementary portions of signal 160 from amplifiers 51 and 55 to obtain simulated signal 160. Comparator 67 additionally compares signal 160 to SOUTH signal from unenergized field winding 27 at second input terminal 66, such that comparator 67 detects the presence of the positive portion of back EMF sine wave 48 and thereupon provides a change in output state on an output line 68. That is, simulated signal 160 in FIG. 5 is slightly greater in magnitude than induced SOUTH signal 161 except during that part of SOUTH signal 161 when back EMF wave 48 becomes positive and causes signal 161 to exceed the magnitude of simulated signal 160. Comparator 67 then provides an output pulse on a line 68 indicating the detection of back EMF wave 48. This output pulse is inverted by an inverter 60 to provide a feedback north signal FBN on an output line 70. As previously discussed, signal FBN is input into signal command source 40 in FIG. 3.

In a like manner, when logic south signal LS causes South field winding 27 to become energized, the circuitry in FIG. 4a detects the presence and phase relationship of a back EMF wave 48 induced by movement of rotor 31 into unenergized North field winding 25 because of mutual inductance between windings 25 and 27. Upon logic signal LS assuming a logic one state, signal inverter 53 inverts signal LS and causes amplifier 55 to change in output on terminal 59 which is coupled to input 58 of amplifier 51 by reactive coupling network 56. Amplifiers 51 and 55 thereupon coact to provide complementary portions of simulated signal 160 at output terminals 57 and 59. Signal summing network 61 sums the output of amplifier 51 with SOUTH signal from South field winding 27 and signal summing network 60 sums the output of amplifier 55 with NORTH signal from North field winding 25 which contains back EMF wave 48 superimposed thereon. After filtering by noise filter 64, separate signals from signal summing networks 60 and 61 are presented at respective inputs 65 and 66 of voltage comparator 67 and the comparator detects back EMF wave 48 from North field winding 25 to provide an output pulse on line 68 in the form of a feedback south signal FBS.

Circuitry similar to FIG. 4a, in FIG. 4b detects back EMF pulses induced into East and West field windings 26 and 28 because of rotor rotation and mutual inductance between windings 26 and 28. Logic east signal LE, which controls energization of East field winding 26, is inverted by a signal inverter 73. The output of inverter 73 is connected to an input terminal 74 of a first operational amplifier 75 to cause amplifier 75 to change in output at an output terminal 76 when signal LE changes to a logic one state. Any change at terminal 76 is presented to an input terminal 77 of a second operational amplifier 78 and to a second input terminal 80 of first amplifier 75 by a reactive coupling network 79. Amplifiers 75 and 78 respond to such reactive coupling to provide complementary portions of simulated signal 160 on respective output terminals 76 and 81. As before, signal 160 is similar to WEST signal 161 induced into unenergized West field winding 28 upon energization of East field winding 26, but without any back EMF wave 48 superimposed thereon. A signal summing network 82 combines one of the complementary portions of simulated signal 160 from output terminal 76 of amplifier 75 with EST signal from unenergized West field winding 28 in FIG. 3. Another signal summing network 83 similarly combines the other complementary portion of signal 160 at the output of second amplifier 78 at terminal 81 with EAST signal from unenergized East field winding 26. Outputs of signal summing networks 82 and 83 upon a pair of respective output lines 84 and 85, after filtering by a noise filter 86, are presented to a pair of input terminals 87 and 88 of a voltage comparator 89. In a manner similar to voltage comparator 67 in FIG. 4a, comparator 89 in FIG. 4b combines the complementary portions of simulated signal 160 present at each input terminal 66 and 65 and then compares simulated signal 160 to signal 161 induced into unenergized West field winding 28 with EMF wave 48 superimposed thereon. When the positive portion of back EMF sine wave 48 causes induced signal 161 to exceed simulated signal 160, voltage comparator 89 changes in output state on an output line 90 which is inverted by signal inverter 91 to provide an east feedback signal FBE on an output line 92 of the inverter.

The circuitry of FIG. 4b operates in a related manner to a logic west signal LW, which is generally 180° out of phase with logic east signal LE. A signal inverter 93 inverts signal LW and presents the inverted signal to a second input 94 of amplifier 78. Amplifier 78 changes in output on output terminal 81 when signal LE assumes a logic one state, which change is coupled by reactive coupling network 79 to input terminal 80 of amplifier 75. Amplifiers 75 and 78 thereupon respond and provide complementary portions of simulated signal 160 at output terminals 76 and 81. After summing of one complementary portion of signal 160 from output terminal 76 with WEST signal by a signal summing network 82 and filtering by a noise filter 86, the combined signal is presented to input 87 of voltage comparator 89. The other complementary portion of signal 160 from output terminal 81 and induced signal 161, after passing through signal summing network 83 and noise filter 86, are presented to input terminal 88 of comparator 89. Comparator 89 responds to the presence of positive back EMF wave 48 by changing in output state at output terminal 90 of the comparator to provide the feedback west signal FBW to signal command source 40 in FIG. 3.

Figure 11:
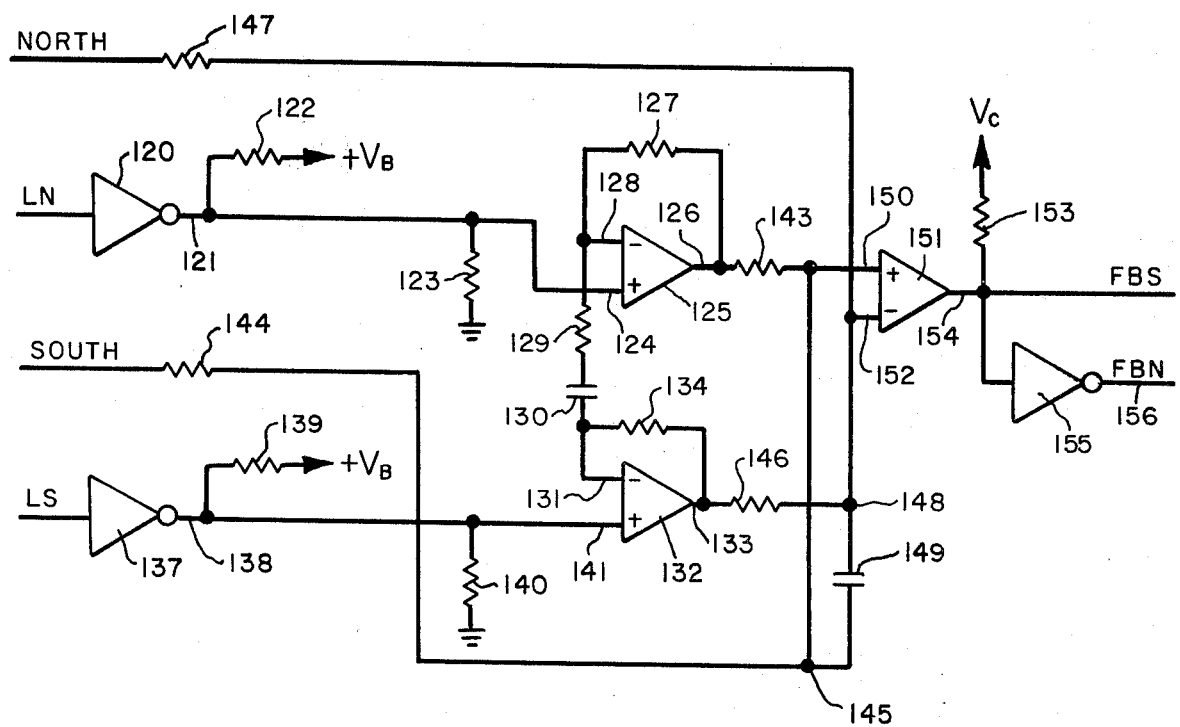
FIG. 11 is an electrical schematic diagram of feedback circuitry shown in block diagram form in either FIG. 4a or 4b for detecting rotational movement of the rotor in the motor and developing a feedback on error signal for the signal command source in FIGS. 3 and 6.

Shown in FIG. 11 is the preferred embodiment of discrete circuitry for the block diagram of FIG. 4a to utilize winding signals NORTH and SOUTH and logic north and south signals LN and LS to generate respective feedback signals FBN and FBS upon detecting back EMF wave 48 alternately induced into unenergized north and south field windings 25 and 27 by movement of rotor 31. North logic signal LN, which is graphically shown in FIG. 9, is inverted by an inverter 120 to its logic complement $\overline{LN}$ at an output terminal 121 of inverter 120. Output terminal 121 is connected to a pullup voltage divider consisting of a resistor 122 connected between terminal 121 and positive voltage supply $V_B$ and another resistor 123 connected between terminal 121 ground. Terminal 121 is also connected to a non-inverting input 124 of a first operational amplifier 125. An output terminal 126 of amplifier 125 is connected via a feedback resistor 127 to an inverting input 128 of amplifier 125. Inverting input 128 is also connected via a series combination of a resistor 129 and a capacitor 130 to an inverting input 131 of a second operational amplifier 132. An output terminal 133 of amplifier 132 is also connected to inverting input 131 by a feedback resistor 134. Resistors 127, 129 and 134 in combination with capacitor 130 constitute a reactive coupling network between first amplifier 125 and second amplifier 132, the coupled operation of which will be more fully appreciated hereinafter.

Logic signal LS is inverted by an inverter 137 to provide its logic complement $\overline{LS}$ at an output terminal 138 of inverter 137. Output terminal 138 is connected to a voltage pullup resistor divider including a resistor 139 connected between terminal 138 and voltage supply $V_B$ and another resistor 140 connected between terminal 138 and ground. Terminal 138 is also connected to a non-inverting input 141 of second amplifier 132. Output signal LNA (FIG. 12) at terminal 126 of first amplifier 125 is summed with SOUTH signal by a resistor 143 in series with output terminal 126 and another resistor 144 in series with SOUTH signal, the resistors 143 and 144 joining at a junction 145 to provide the resultant sum. In a similar manner, the output signal LSA (FIG. 12) of second amplifier 132 at output terminal 133 is summed with NORTH signal by a resistor 146 in series with output 133 and another resistor 147 in series with NORTH signal, the resistors 146 and 147 being joined at a junction 148 to provide the resultant sum. A filtering capacitor 149 between junctions 145 and 148 provides noise filtering of the respective resultant sums at these junctions. The sum of the signal LNA from first amplifier 125 and SOUTH signal are input into a non-inverting input 150 of a differential voltage comparator 151 and the resultant sum of signal LSA from second amplifier 132 and NORTH signal are input into an inverting input 152 of comparator 151. Comparator 151 normally sinks current from voltage supply $V_C$ through a resistor 153. Upon detecting back EMF wave 48 superimposed upon SOUTH signal from field winding 27 due to energization of North field winding 25, the output of comparator 151 at an output terminal 154 assumes a logic one state. An inverter 155 connected to output terminal 154 of comparator 151 thereupon provides north feedback signal FBN at an output terminal 156. Upon detecting back EMF wave 48 superimposed upon signal 161 induced into North field winding 25 by energization of South field winding 27, comparator 151 provides feedback signal FBS at output terminal 154.

Figure 12:
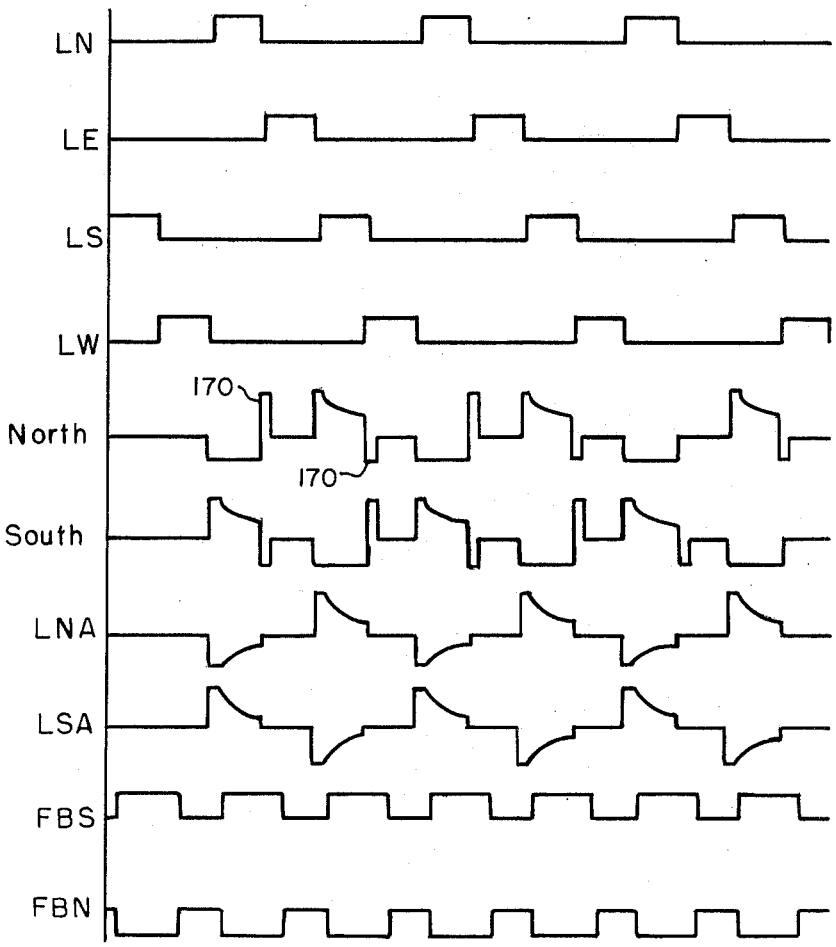
FIG. 12 is a graphic diagram of electrical signals associated with the feedback circuitry of FIG. 11.

Operation of the circuitry in FIG. 11 can better be understood in conjunction with the various signals illustrated in FIG. 9. Upon receiving a logic north pulse LN, inverter 120 transforms the positive pulse into a negative pulse $\overline{LN}$ at a non-inverting input 124 of first or logic north amplifier 125. Output of amplifier 125 therefore quickly assumes a lower potential at output terminal 126, as seen in waveform LNA in FIG. 9. This negative transition of amplifier 125 is coupled by resistors 127 and 129 and capacitor 130 to inverting input 131 of second or logic south amplifier 132. Amplifier 132 responds by producing a positive going transition at output 133, as seen in waveform LSA in FIG. 12. Thereafter, as capacitor 130 begins charging toward quiescent conditions from the output of amplifier 132 through resistor 134 and from the output of amplifier 125 through resistors 127 and 129, waveform LNA at output 126 of amplifier 125 and waveform LSA at output 133 of amplifier 132 both begin to exponentially decay toward quiescent conditions with a time constant determined by the values of resistors 129, 127 and 134 and capacitor 130. This time constant is selected to equal the time constant of the exponential decay of induced signal 161 from South winding 27 which is determined by the ratio of inductance to inductive path resistance for winding 27. To this end, resistors 129, 127 and 134 and capacitor 130 are selected for precision, such as one percent tolerance, and good temperature stability. Amplifiers 125 and 132 thus generate complementary portions of simulated signal 160 in FIG. 5 in response to logic north signal LN. At the same time, SOUTH signal, as seen in FIG. 12, will contain back EMF superimposed thereon, like induced signal 161 in FIG. 5 including positive going back EMF wave 48. One complementary portion of simulated signal 160 from amplifier 132 will be applied to inverting terminal 152 of comparator 151 through summing resistor 146. At the same time, another complementary portion of signal 160 from amplifier 125 and SOUTH signal will be applied to non-inverting input 150 of comparator 151 through summing resistor 144. Summing resistors 143, 144, 146 and 147 are selected in value such that signal 160, as additively combined by opposite polarity input terminals 150 and 152 of comparator 151, will initially slightly exceed the magnitude of SOUTH signal as seen at input terminal 150 of comparator 151. The output of comparator 151 will therefore remain in a low state until positive going back EMF wave 48 on SOUTH signal, which appears at this time as waveform 161 in FIG. 5, exceeds signal 160 whereupon inverter 155 will produce a negative output pulse FBN for the duration that waveform 161 exceeds waveform 160 in magnitude.

Circuitry in FIG. 11 will similarly simulate the signal induced into North field winding 25 by energization of South field winding 27, which is initiated by logic south signal LS. Signal LS is inverted by inverter 137 to a negative going pulse at non-inverting input 141 of second or logic south amplifier 132. The negative pulse at input 141 causes amplifier 132 to assume a negative going potential as seen in waveform LSA in FIG. 12. This negative going potential is applied to inverting input 128 of first or logic north amplifier 125 by coupling capacitor 130 to cause a positive going transition at the output of amplifier 125. Thereafter, charging of coupling capacitor 130 from output terminal 133 of amplifier 132 through resistor 134 and from output 126 of amplifier 125 through resistors 127 and 129 will cause exponential decays of respective outputs of amplifiers 132 and 125 toward quiescent conditions. Amplifiers 125 and 132 thus generate complementary portions of simulated signal 160 which may be oppositely added as by comparator 151 to generate simulated signal 160. Signal 160 resembles the signal induced into North field winding 25 by energization of South field winding 27 due to mutual inductance therebetween but without any back EMF wave. Simulated signal LNA from amplifier 125 is then applied to non-inverting input 150 of comparator 151 through summing resistor 143. Simulated signal LSA from amplifier 132 and NORTH signal from North field winding 25 are applied to inverting input 152 of comparator 151 through respective summing resistors 146 and 144. Again, summing resistors 143, 144, 146 and 147 are selected such that the complementary portions of signal 160 present in amplifier signals LNA and LSA, when oppositely added by comparator 151, will exceed the magnitude of NORTH signal seen at terminal 152 of comparator 151 except during the presence of back EMF. During back EMF, NORTH signal will exceed simulated signal 160 to cause comparator 151 to generate a feedback south signal FBS on output line 154 of comparator 151.

It will be appreciated that generation of feedback north signal FBN necessarily results in generation of another signal on feedback south line FBS and vice versa. However, signal command source 40 can discriminate between feedback north or south signals FBN or FBS, as by comparison of signals FBN and FBS with respect of logic north or south signals LN or LS.

It will be further appreciated by those skilled in the art that other means may be employed for routing simulated signals LNA or LSA and winding signals NORTH or SOUTH to respective inputs 150 and 152 of comparator 151.

Circuitry identical to that of FIG. 8 may be utilized to complete another feedback loop associated with East field winding 26 and West field winding 28 to generate respective feedback signals FBE and FBW in the block diagram of FIG. 4b. That is, circuitry otherwise identical to FIG. 8 would be responsive to logic signals LE and LW and winding signals EAST and WEST to generate respective feedback signals FBE and FBW to signal command source 40.

The entire control system has good immunity to voltage supply variation in generating and comparing simulated signal 160 and induced signal 161 since logic north signal $\overline{LN}$ and logic south $\overline{LS}$ at respective amplifier input terminals 124 and 131 in FIG. 8 are derived from voltage supply $V_B$ which is the same voltage supply used to energize field windings 25, 26, 27 and 28 to obtain induced signal 161 from one of the windings. Simulated signal 160 generated by amplifier 125 or 132 therefore tends to track changes in magnitude of induced signal 161 due to any variation in voltage supply $V_B$.

With the above-described control system, an inexpensive stepping motor, for example, having a rated capability of about 300 to 400 steps per second, will perform as a much more expensive stepping motor having stepping capabilities of 3,000 or more steps per second. Since the control system utilizes readily available and inexpensive circuit elements, the cost to implement the control system is easily justifiable from an economic standpoint in view of the relative cost of high performance stepping motors to inexpensive stepping motors.

Implicit in the above discussion of the control system are methods of controlling a multi-phase motor having a plurality of electromagnetic field windings which are energizable at periodic intervals to cause rotational movement of the rotor. The basic method includes the steps of generating at least one feedback signal related to rotational movement of the rotor, generating a plurality of logic signals suitable for energizing the windings in a two phase on mode, a one phase on mode, or at least one fractional phase on mode, generating a plurality of phase on selection signals in response to at least one feedback signal, selecting one of the plurality of logic signals with the phase on selection signals for two phase on, single phase on or fractional phase on energization of the windings, and energizing the windings in accordance with the selected logic signals.

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. A control system for controlling a motor subject to variable load conditions and of the type having a plurality of electromagnetic field windings adapted to be separately energized to control rotation of a rotor in the motor, said control system comprising:
   switching means for controlling energization of each of said electromagnetic field windings in response to an applied logic control signal;
   signal generating means for simultaneously generating a first logic control signal adapted to cause said switching means to energize said field windings in a two-phase-on mode, a second logic control signal adapted to cause said switching means to energize said field windings in a one-phase-on mode and a third logic control signal adapted to cause said switching means to energize said field windings in a fractional-phase-on mode;
   means for detecting rotational movement of the rotor in said motor, said detecting means providing at least one feedback signal in response to movement of said rotor;
   logic signal selecting means responsive to said feedback signal for selecting and applying one of said phase-on logic control signals to said switching means whereby said motor is selectively energized in a two-phase-on mode, a single-phase-on mode or a fractional-phase-on mode in response to changes in the load condition of the motor.

2. A control system as defined in claim 1 wherein said logic signal selecting means include a plurality of individual logic gates each having an input coupled to a respective one of said phase-on logic control signals and an output coupled to said switching means, only one of said logic gates being enabled during operation of the motor to apply an appropriate logic control signal to said switching means.

3. A control system as defined in claim 1 wherein said fractional-phase-on logic control signal comprises a 1/n-phase-on control signal where n is an integer selected from the group of two, four or eight.

4. A control system as defined in claim 1 wherein said motor includes two phases and said plurality of electromagnetic field windings includes four field windings, and further including
   first flip flop means having four logic output signals adapted to cause said switch means to control energization of respective ones of said four field windings of said motor in a two-phase-on mode;
   second flip flop means having four logic output signals adapted to cause said switch means to control energization of respective ones of said four field windings of said motor in a one-phase-on mode;
   third flip flop means having four output logic signals; and
   logic signal combining means responsive to respective output signals of said second and third flip flop means to provide four output signals adapted to cause said switch means to control energization of respective ones of said four field windings of said motor in a fractional-phase-on mode.

5. A control system as defined in claim 1 wherein said motor has at least a pair of the plurality of electromagnetic field windings with mutual inductance therebetween such that rotational movement of the rotor of said motor causes a back EMF to be induced into an unenergized one of said plurality of electromagnetic field windings with the back EMF superimposed upon another signal induced into said unenergized winding because of mutual inductance between said unenergized winding and an energized winding;
   electronic circuit means for simulating the signal induced into said unenergized winding due to mutual inductance with said energized winding; and
   back EMF detecting means responsive to said simulated signal and to the signal induced into said unenergized winding with the back EMF superimposed thereon to detect said back EMF and produce a change in said feedback signal upon the detection of said back EMF.

6. A method of controlling a multi-phase motor of the type subject to variable load conditions and having a plurality of electromagnetic field windings adapted to be separately energized to control rotational movement of a rotor in the motor, said method comprising the steps of:
   detecting rotational movement of said rotor;
   generating a feedback signal related to rotational movement of said rotor;
   generating a trio of simultaneous individual logic control signals adapted to energize said plurality of windings in a two-phase-on mode, a one-phase-on mode, and a fractional-phase-on mode, respectively;
   generating a phase-on selection signal in response to said at least one feedback signal;
   selecting the appropriate one of said logic control signals for either two-phase-on, single-phase-on or fractional-phase-on mode energization of said field windings with said phase-on selection signal according to the load condition of the motor; and
   energizing said plurality of field windings in accordance with the selected logic control signal to cause rotation of said rotor.

7. A control system for controlling a motor subject to variable load conditions and of the type having a plurality of electromagnetic field windings adapted to be separately energized to control rotation of a rotor in the motor, said control system comprising:

switching means for controlling energization of each of said electromagnetic field windings in response to an applied logic control signal;

signal generating means responsive to an applied mode selection signal for generating a logic control signal adapted to cause said switching means to energize said field windings in phase-on modes ranging from two-phase-on to fractional-phase-on;

means for detecting rotational movement of the rotor in said motor, said detecting means providing at least one feedback signal in response to movement of said rotor; and logic signal selecting means responsive to said feedback signal for generating a mode selection signal for application to said signal generating means whereby a logic control signal appropriate to the load condition of the motor is applied to said switching means to appropriately energize said motor.

8. A control system as defined in claim 7 wherein said fractional-phase-on logic control signal comprises a 1/n-phase-on control signal where n is an integer selected from the group of two, four or eight.

9. A method of controlling a multi-phase motor of the type having a plurality of electromagnetic field windings adapted to be separately energized to control rotational movement of a rotor in the motor, said method comprising the steps of:

detecting rotational movement of said rotor;

generating a feedback signal related to rotational movement of said rotor;

generating a plurality of logic signals adapted to energize respective ones of said plurality of windings in a two phase on mode;

generating a plurality of logic signals adapted to energize respective ones of said plurality of field windings in a one phase on mode;

generating a plurality of logic signals adapted to energize respective ones of said plurality of field windings in a fractional phase on mode;

generating a plurality of phase on selection signals in response to said at least one feedback signal;

selecting one of said plurality of logic signals for either two phase on mode, signal phase on mode or fractional phase on mode energization of said field windings with said plurality of phase on selection signals; and energizing said plurality of field windings in accordance with the selected plurality of logic signals to cause rotation of said rotor.

\* \* \* \* \*

UNITED STATES PATENT AND TRADEMARK OFFICE
CERTIFICATE OF CORRECTION

PATENT NO. : 4,282,472

DATED : August 4, 1981

INVENTOR(S) : Donald P. Martin

It is certified that error appears in the above—identified patent and that said Letters Patent are hereby corrected as shown below:

Col. 4, line 34: "on" should be --or--.
Col. 7, line 29: "RES" should be --$\overline{RES}$--.
Col. 8, line 63: "208" should be --209--.
Col. 9, line 1: "Q3" should be --$\overline{Q3}$--.
line 2: "Q3" should be --$\overline{Q3}$--.
Col. 15, line 10: "Fig. 9" should be --Fig. 12--.
line 15: "Fig. 9" should be --Fig. 12--.
Col. 20, line 20: "signal" should be --single--.

Signed and Sealed this

Seventeenth Day of November 1981

[SEAL]

Attest:

GERALD J. MOSSINGHOFF

Attesting Officer     Commissioner of Patents and Trademarks